(12) United States Patent
Mallikarjunappa et al.

(10) Patent No.: US 12,457,565 B2
(45) Date of Patent: Oct. 28, 2025

(54) REDUCED POWER HEADROOM REPORTING WITH CONFIGURED GRANTS

(71) Applicant: QUALCOMM Incorporated, San Diego, CA (US)

(72) Inventors: Mohankumar Mallikarjunappa, Bengaluru (IN); Penchal Prasad Goddeti, Hyderabad (IN); Srinivasa Ragimakalahally Konappa, Bangalore (IN); Vinesh Tarphe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 492 days.

(21) Appl. No.: 18/151,317

(22) Filed: Jan. 6, 2023

(65) Prior Publication Data

US 2024/0236873 A1   Jul. 11, 2024

(51) Int. Cl.
*H04W 52/36* (2009.01)
*H04W 24/08* (2009.01)
*H04W 52/24* (2009.01)
*H04W 72/12* (2023.01)

(52) U.S. Cl.
CPC ........ *H04W 52/365* (2013.01); *H04W 24/08* (2013.01); *H04W 52/242* (2013.01); *H04W 72/12* (2013.01)

(58) Field of Classification Search
None
See application file for complete search history.

(56) References Cited

U.S. PATENT DOCUMENTS

| | | | |
|---|---|---|---|
| 2020/0037269 A1* | 1/2020 | Ryu | H04W 52/365 |
| 2020/0107272 A1* | 4/2020 | He | H04W 52/325 |
| 2023/0122848 A1* | 4/2023 | Kim | H04L 5/001 455/522 |
| 2024/0031948 A1* | 1/2024 | Zhang | H04B 7/0404 |
| 2024/0163011 A1* | 5/2024 | Hasegawa | H04L 1/0071 |

* cited by examiner

*Primary Examiner* — Saumit Shah
(74) *Attorney, Agent, or Firm* — Holland & Hart LLP

(57) ABSTRACT

Methods, systems, and devices for wireless communications are described. A user equipment (UE) may monitor for dynamic grants to obtain an average periodicity of dynamic grants received within a sliding window. The UE may transmit, based at least in part on detecting a power headroom report trigger, one or more power headroom reports identifying power headroom information based at least in part on the average periodicity of dynamic grants received within the sliding window and the power headroom report trigger.

30 Claims, 10 Drawing Sheets

REDUCED POWER HEADROOM REPORTING WITH CONFIGURED GRANTS

FIELD OF TECHNOLOGY

The following relates to wireless communications, including reduced power headroom reporting with configured grants.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support reduced power headroom reporting with configured grants (CGs). For example, the described techniques provide for a user equipment (UE) to receive, monitor for, or otherwise detect dynamic grants (e.g., one or more or a plurality of) to obtain, identify or otherwise determine an average periodicity for the dynamic grants received within a sliding window. For example, the UE may monitor for downlink control information (DCI) grants identifying or otherwise allocating dynamic resources to the UE to use for uplink communications. The UE may identify or otherwise determine the average periodicity of such dynamic grants based on the duration of the sliding window and the total number of dynamic grants received during the sliding window being used to determine the average periodicity for the dynamic grants. A power headroom report (PHR) trigger may occur (e.g., a PHR expiry timer expiration and/or downlink pathloss change) which may generally trigger the UE to transmit a PHR to the network. However, the UE may transmit one or more PHR(s) identifying the power headroom information based on the average periodicity of the DCI grants. In some examples, this may include the UE skipping, refraining from, or otherwise delaying transmission of a PHR to the network using configured grant resources based the average periodicity of the dynamic grants received within the sliding window.

A method for wireless communication at a UE is described. The method may include monitoring for dynamic grants to obtain an average periodicity of dynamic grants received within a sliding window and transmitting, based on detecting a PHR trigger, one or more PHRs identifying power headroom information based on the average periodicity of dynamic grants received within the sliding window and the PHR trigger.

An apparatus for wireless communication at a UE is described. The apparatus may include a processor, memory coupled with the processor, and instructions stored in the memory. The instructions may be executable by the processor to cause the apparatus to monitor for dynamic grants to obtain an average periodicity of dynamic grants received within a sliding window and transmit, based on detecting a PHR trigger, one or more PHRs identifying power headroom information based on the average periodicity of dynamic grants received within the sliding window and the PHR trigger.

Another apparatus for wireless communication at a UE is described. The apparatus may include means for monitoring for dynamic grants to obtain an average periodicity of dynamic grants received within a sliding window and means for transmitting, based on detecting a PHR trigger, one or more PHRs identifying power headroom information based on the average periodicity of dynamic grants received within the sliding window and the PHR trigger.

A non-transitory computer-readable medium storing code for wireless communication at a UE is described. The code may include instructions executable by a processor to monitor for dynamic grants to obtain an average periodicity of dynamic grants received within a sliding window and transmit, based on detecting a PHR trigger, one or more PHRs identifying power headroom information based on the average periodicity of dynamic grants received within the sliding window and the PHR trigger.

In some examples of the method, apparatuses, and non-transitory computer-readable medium described herein, transmitting the one or more PHRs may include operations, features, means, or instructions for delaying transmission of at least one of the one or more PHRs using CG resources based on the average periodicity of dynamic grants received within the sliding window.

Some examples of the method, apparatuses, and non-transitory computer-readable medium described herein may further include operations, features, means, or instructions for detecting the o power headroom trigger based on an uplink buffer status of the UE, expiration of a power headroom expiry timer, a threshold change in a downlink pathloss, or a combination thereof.

Some examples of the method, apparatuses, and non-transitory computer-readable medium described herein may further include operations, features, means, or instructions for transmitting at least one of the one or more PHRs using at least a portion of CG resources based at least on part on an uplink buffer of the UE storing data.

Some examples of the method, apparatuses, and non-transitory computer-readable medium described herein may further include operations, features, means, or instructions for receiving at least one dynamic grant during the sliding window, the at least one dynamic grant identifying uplink resources allocated to the UE and transmitting at least one PHR of the one or more PHRs using at least a portion of the uplink resources based at least on part on an uplink buffer of the UE being empty and receiving the at least one dynamic grant.

Some examples of the method, apparatuses, and non-transitory computer-readable medium described herein may further include operations, features, means, or instructions for determining that a dynamic grant may be not received during the sliding window and transmitting at least one PHR of the one or more PHRs using at least a portion of CG resources based at least on part on an uplink buffer of the UE being empty and the dynamic grant not being received during the sliding window.

Some examples of the method, apparatuses, and non-transitory computer-readable medium described herein may further include operations, features, means, or instructions for identifying a maximum PHR delay based on a duration of the sliding window, where at least one PHR may be transmitted within the maximum PHR delay.

Some examples of the method, apparatuses, and non-transitory computer-readable medium described herein may further include operations, features, means, or instructions for applying a machine learning model to determine the average periodicity of dynamic grants received within the sliding window.

Some examples of the method, apparatuses, and non-transitory computer-readable medium described herein may further include operations, features, means, or instructions for receiving one or more radio resource control signals identifying one or more CG allocations, where a periodicity for transmitting the one or more PHRs may be based on at least one of the one or more CG allocations.

Some examples of the method, apparatuses, and non-transitory computer-readable medium described herein may further include operations, features, means, or instructions for maintaining a running average of the average periodicity of dynamic grants received during each instance of a duration of the sliding window across for a set of multiple instances.

DETAILED DESCRIPTION

Figure 1:
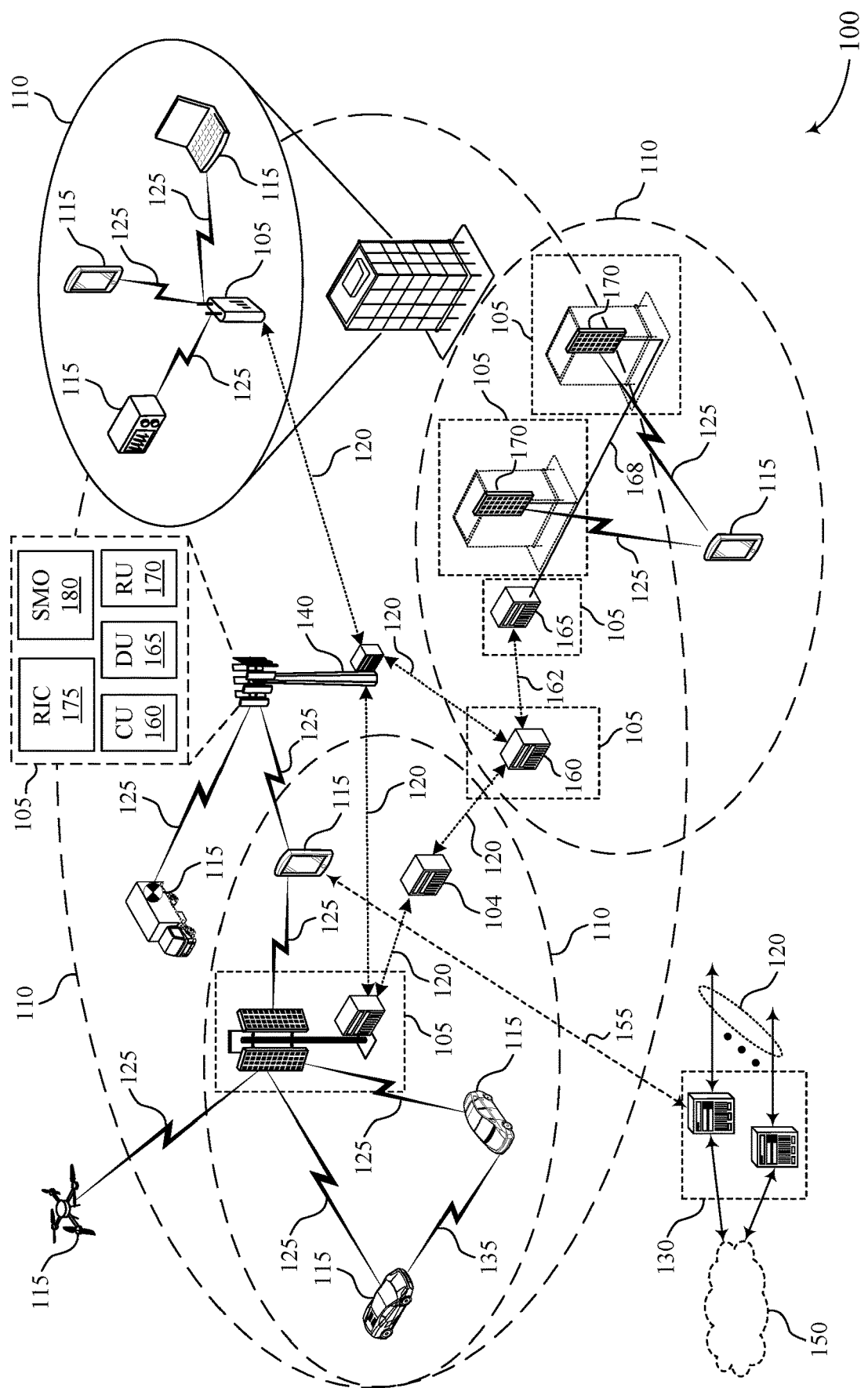
FIG. 1 illustrates an example of a wireless communications system that supports reduced power headroom reporting with configured grants (CGs) in accordance with one or more aspects of the present disclosure.

Some wireless networks use power headroom report (PHR) techniques in which a user equipment (UE) transmits information indicative of its PHR status or information to the network. The PHR reporting may use a set of bits set to positive values to indicate the difference between the maximum UE transmit power and the current UE transmit power or to negative values to indicate the difference between the maximum UE transmit power and the calculated UE transmit power. The UE may provide PHRs to the network using semi-persistently configured resources (e.g., configured grant (CG) resources), dynamically configured resources (e.g., downlink control information (DCI) allocated resources) or both. For example, a CG configuration may identify resources to be used for the PHR reporting from the UE. The UE may also be dynamically configured with uplink resources which may be used for PHR reporting from the UE. However, such networks may continue to transmit an empty PHR (e.g., an empty transport block (TB)) using the CG resources according to the CG configuration associated with the CG resources, which can be inefficient in terms of resource efficiency and power consumption. Further, in some cases the UE may be dynamically configured with uplink resources that could be used for providing the PHR reporting to the network, which further increases resource inefficiency and power consumption when considered with the CG-based PHR reporting.

The described techniques relate to improved methods, systems, devices, and apparatuses that support reduced PHR reporting with CGs. For example, the described techniques provide for a UE to receive, monitor for, or otherwise detect dynamic grants to obtain, identify or otherwise determine an average periodicity for the dynamic grants received within a sliding window. For example, the UE may monitor for DCI grants identifying or otherwise allocating dynamic resources to the UE to use for uplink communications. The UE may identify or otherwise determine the average periodicity of such dynamic grants based on the duration of the sliding window and the total number of dynamic grants received during the sliding window being used to determine the average periodicity for the dynamic grants. A PHR trigger may occur (e.g., a PHR expiry timer expiration and/or downlink pathloss change) which may generally trigger the UE to transmit a PHR to the network. However, the UE may transmit one or more PHR(s) identifying the power headroom information based on the average periodicity of the DCI grants. In some examples, this may include the UE skipping, refraining from, or otherwise delaying transmission of a PHR to the network based the average periodicity of the dynamic grants received within the sliding window.

Aspects of the disclosure are initially described in the context of wireless communications systems. Aspects of the disclosure are further illustrated by and described with reference to apparatus diagrams, system diagrams, and flowcharts that relate to reduced power headroom reporting with CGs.

FIG. 1 illustrates an example of a wireless communications system 100 that supports reduced power headroom reporting with CGs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support reduced power headroom reporting with CGs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IOT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Figure 2:
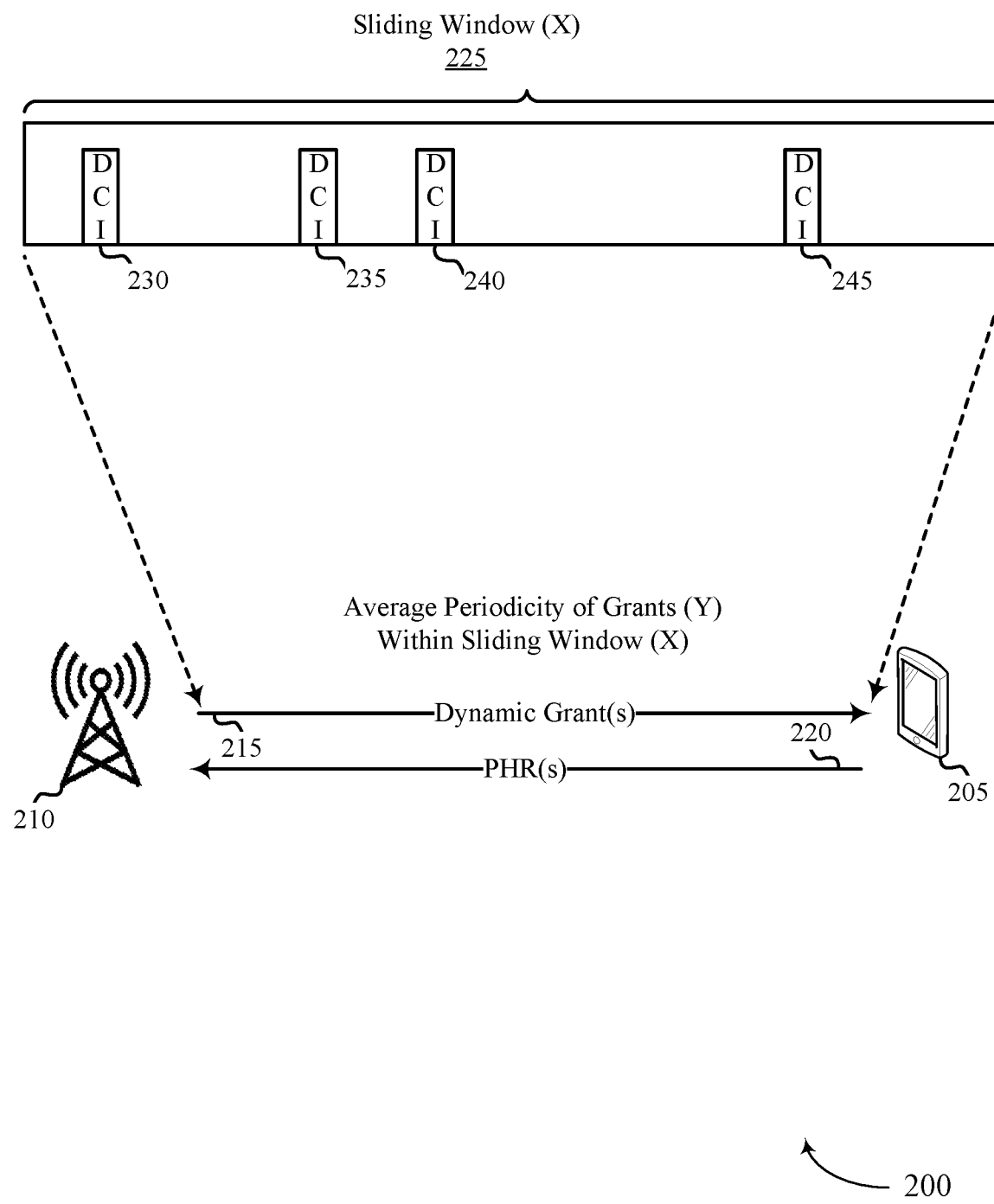
FIG. 2 illustrates an example of a wireless communications system that supports reduced power headroom reporting with CGs in accordance with one or more aspects of the present disclosure.

A UE 115 may monitor for dynamic grants to obtain an average number of dynamic grants received within a sliding window. The UE 115 may transmit, based at least in part on detecting a PHR trigger, one or more PHRs identifying power headroom information based at least in part on the average periodicity of dynamic grants received within the sliding window and the PHR trigger FIG. 2 illustrates an example of a wireless communications system 200 that supports reduced power headroom reporting with CGs in accordance with one or more aspects of the present disclosure. Wireless communications system 200 may implement aspects of wireless communications system 100. Aspects of wireless communications systems 200 may include a UE 205 and a network entity 210, which may be examples of the corresponding devices described herein. Wireless communications system 200 illustrates a non-limiting example of power optimization by reducing PHR reporting with CGs when dynamic uplink grants are configured by the network.

As discussed above, wireless networks generally rely on PHR reporting by UE to obtain PHR information for the reporting UE. The PHR reporting provides a mechanism for the UE to report it's available transmit power (e.g., difference between maximum and actual/expected transmit powers). In some examples, the PHR reporting may use CG resources. For example, the UE 205 may receive or otherwise obtain one or more RRC signals identifying CG allocation(s) for the UE 205. The CG allocations may include various configurations, parameters, resources, and the like, for the UE 205 to use for uplink communications to the network entity 210. For example, one or more of the CG allocations and/or separate PHR configuration signaling may include a PHR periodic timer (e.g., phr-PeriodicTimer) defining the periodicity for PHR reporting by the UE 205 using the CG allocated resources. The one or more CG allocations and/or separate PHR configuration signaling may also include a PHR prohibit timer (e.g., phr-ProhibitTimer). Other PHR reporting details may also be defined via the CG configuration signaling and/or using other signaling.

However, in some examples the PHR reporting and CG grant periodicities may be integral multiples of each other, or the same. Once a PHR is reported using the CG allocations, the PHR is to be always reported using the CG grants even when dynamic grants are frequently allocated by the network. As one non-limiting example, the CG allocation may include a configured scheduling-radio network temporary identifier (CS-RNTI) periodicity of 20 slots (e.g., with a 30 KHz subcarrier spacing (SCS)) with a PHR reporting periodicity of 100 ms. According to conventional networks, once the PHR is sent using the CS-RNTI grant (e.g., using the semi-persistent resources allocated in the CG allocation), subsequent PHR reporting always uses the CS-RNTI grants. This is the case even when there is no valid data traffic to send since the CS-RNTI grant is already present (e.g., configured or otherwise available) when the PHR periodic timer expires (e.g., when a PHR expiry timer expires). This results in an inefficient power impact whenever CG and dynamic grants are both configured for the UE 205. This result is inefficient when the CS-RNTI grants are configured with a periodicity of 20 slots and the PHR reporting periodicity is 100 ms, but even further degrades performance when the PHR reporting periodicity is less (e.g., 10 ms) as it would require an empty transport block (TB) to be sent when sending the PHR according to the PHR periodicity.

Accordingly, aspects of the techniques described provide various mechanisms that support reduced PHR reporting with CGs. Broadly, this may include machine learning the dynamic grant periodicity (e.g., average frequency) within a moving average window of X (e.g., sliding window 225 having a duration of X) and calculating the average dynamic grant timer (e.g., average dynamic grant periodicity of Y). For example, at 215 the network entity 210 may transmit or otherwise provide (and the UE 205 may receive, monitor for, or otherwise obtain) dynamic grant(s) (e.g., DCI-based uplink grants) within a sliding window 225. Broadly, the sliding window 225 may generally refer to a window or time period in the time domain during which the UE 205 monitors for DCI grant(s) (e.g., for dynamic grants allocating uplink resources for the UE 205). The sliding window 225 may be autonomously selected by the UE 205 and/or may be (pre) configured by the network (e.g., via the network entity 210). For example, the UE 205 may autonomously select the duration of the sliding window 225 (e.g., X) based on various considerations, such as a history of previously received dynamic grants, expected dynamic grant(s) (e.g., based on previously submitted scheduling requests), or other parameters, metrics, or factors that are autonomously identified by the UE 205 and/or (pre)configured by the network. In the (pre)configured scenario, this may include the network (e.g., via the network entity 210) transmitting RRC signal(s), medium access control-control element (MAC-CE) signaling, or other signaling to (pre)configure and/or update the duration of the sliding window 225 for the UE 205.

In some aspects, the sliding window 225 may be a moving window in the time domain. For example, the UE 205 may monitor for dynamic grant(s) during the last X milliseconds, symbols, slots, or any other measure in the time domain.

That is, in some examples the sliding window 225 may begin at the current time and extend backwards X milliseconds, symbols, slots, and so forth. In some examples, the sliding window 225 may include a window having a duration of X milliseconds within the most recent time period (e.g., within the last or most recent set of symbols, slots, frames, during the most recent number of seconds or minutes, and so forth).

During the sliding window 225, the UE 205 may monitor for the dynamic grant(s) (which may also be referred to as cell-radio network temporary identifier (C-RNTI) grants) to obtain, identify, or otherwise determine an average periodicity of grants (e.g., the dynamic grant(s)) received within or during the sliding window 225. In some aspects, the UE 205 may update the average periodicity of the dynamic grants received during each instance of the sliding window 225 (e.g., as the sliding window progress along the time domain). That is, the UE 205 may continuously monitor for dynamic grants and also have a timer, clock, or counter running corresponding to the duration of the sliding window 225. Each dynamic grant received during an instance (e.g., during the period X of the sliding window 225) may be added to the cumulative total for the dynamic grants. Thus, the UE 205 may identify or otherwise determine the average number of grants received during the sliding window 225 and use this information to identify or otherwise determine an average periodicity for the dynamic grants received during the sliding window 225.

That is, the UE 205 may identify or otherwise determine the average periodicity of such dynamic grants based on the duration of the sliding window 225 and the total number of dynamic grants received. The total number of dynamic grants received during the sliding window 225 may be used to determine the average periodicity for the dynamic grants received within the sliding window 225. For example, in the non-limiting example illustrated in FIG. 2, the UE 205 may receive or otherwise detect a dynamic grant 230, a dynamic grant 235, a dynamic grant 240, and a dynamic grant 245 (e.g., four dynamic grants). It is to be understood that any number of dynamic grants may be received by the UE 205 during the sliding window 225 (e.g., based on traffic patterns) and/or at any time during the duration of the sliding window 225. Thus, in this non-limiting example four dynamic grants are received within sliding window 225. In an example where a duration of the sliding window 225 is 100 ms (e.g., X=100 ms), then the average periodicity for the dynamic grants would be 25 ms (e.g., Y=25 ms). As another non-limiting example where two dynamic grants were received within the sliding window 225 having a duration of 100 ms, this would result in an average periodicity for the dynamic grants of 50 ms (e.g., Y=50 ms). In some examples, the UE 205 may apply a machine learning model, artificial intelligence model, or other learning model when identifying or otherwise determining the average periodicity of the dynamic grants received within the sliding window 225. As discussed above, the UE 205 may also be configured with CG allocation(s) identifying semi-persistent uplink resources configured for the UE. In some aspects, the UE 205 may transmit or otherwise provide PHR reporting to the network based, at least to some degree, on the CG allocations.

For example, at 220 the UE 205 may transmit or otherwise provide one or more PHRs to the network entity 210 based on a PHR trigger and the average periodicity of the dynamic grants received during the sliding window 225. In some examples, this may include the UE 205 delaying transmission of at least one PHR using CG resources based on the average periodicity of dynamic grants received within the sliding window 225.

For example, a PHR trigger may occur which may generally trigger the UE 205 to transmit a PHR to the network. The PHR trigger may be based on expiration of a PHR expiry timer and/or a downlink pathloss change satisfying a threshold amount of change. Conventionally the UE 205 would transmit the PHR to the network in response to the PHR trigger occurrence using the CG resources identified in the CG allocation. However, according to the techniques described herein the UE 205 may, instead, delay transmitting the PHR in response to the PHR trigger and wait for the average periodicity of the dynamic grants received within the sliding window 225 (e.g., may wait for the duration of Y). That is, this may include the UE 205 skipping, refraining from, or otherwise delaying transmission of a PHR to the network based the average number of dynamic grants received within the sliding window 225 and the PHR trigger.

More particularly, the UE 205 may skip or delay transmission of the PHR that would otherwise be triggered by the PHR trigger occurrence using CG resources and, instead, wait for the average periodicity of the dynamic grants (e.g., Y milliseconds) to determine if a dynamic grant allocating uplink resources is received. In some aspects, this may be based on whether an uplink buffer of the UE 205 stores data to be communicated. If the uplink buffer of the UE 205 stores data, the UE 205 may transmit the PHR using the CG resources in response to the PHR trigger.

However, if the uplink buffer of the UE 205 does not store data (e.g., is empty), the UE 205 may instead skip or delay transmitting the PHR using the CG allocations (e.g., the CS-RNTI grant) and, instead, wait for dynamic grants for Y milliseconds (e.g., for the periodicity of dynamic grants received during the sliding window 225). If the UE 205 receives at least one dynamic grant (e.g., DCI grant) during the Y milliseconds, the UE may transmit the PHR using the dynamic resources identified or otherwise allocated by the dynamic grant. If no dynamic grant is received during the Y milliseconds, then the UE 205 may transmit the PHR to the network using the CG resources according to the CG allocations (e.g., using the CG resources).

That is and when there is no data in the uplink buffer of the UE 205, the UE 205 may use the dynamic resources allocated in the dynamic grant to transmit the PHR if a dynamic grant is received within Y milliseconds of the PHR trigger. If no dynamic grant is received during the Y milliseconds, the UE 205 may proceed with transmitting the PHR using the CG resources. Accordingly, the UE 205 may delay transmitting a PHR using CG resources—which results in subsequent PHRs always being sent using CG resources—and use dynamic resources for PHR reporting based on the average periodicity of the dynamic grants received within the sliding window 225. This may improve efficiency since, once PHR reporting occurs using CG resources, subsequent PHR reporting using the CG resources still occurs even when there is no valid data traffic to send (resulting in an empty TB being transmitted).

In some aspects, a maximum PHR delay may be (pre)configured or otherwise provided to the UE 205 and/or may be autonomously identified by the UE 205. As one non-limiting example, the maximum delay for PHR reporting may be set to X milliseconds plus the CS-RNTI periodicity. This may be set even when the network does not send any uplink grants to the UE 205 (e.g., when no dynamic grants are received). This may enable transmitting at least one PHR to the network within the maximum PHR delay.

Figure 3:
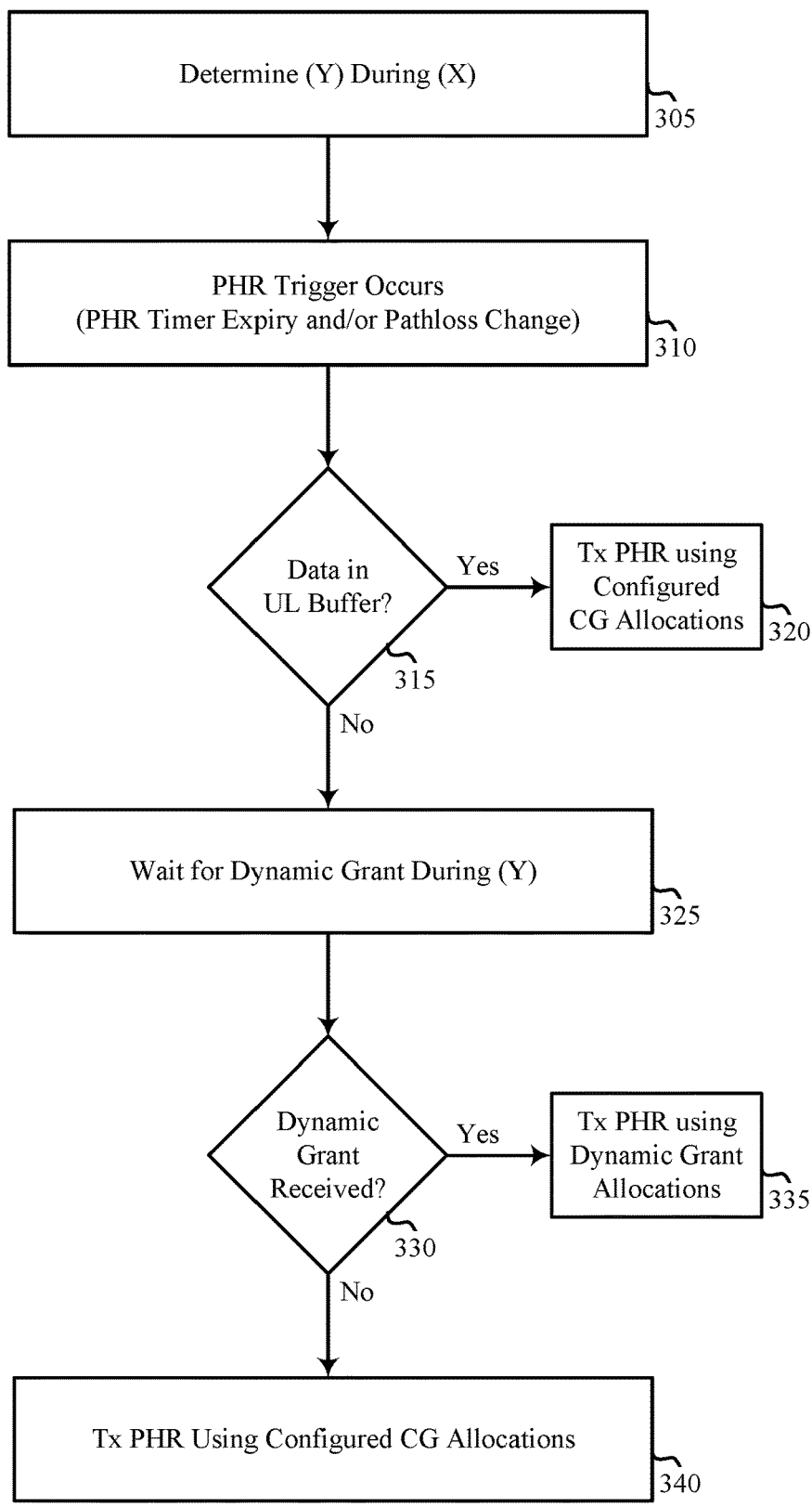
FIG. 3 illustrates an example of a method that supports reduced power headroom reporting with CGs in accordance with one or more aspects of the present disclosure.

FIG. 3 illustrates an example of a method 300 that supports reduced power headroom reporting with CGs in accordance with one or more aspects of the present disclosure. Method 300 may implement aspects of wireless communications systems 100 and/or 200. Aspects of method 300 may be implemented at or implemented by a UE and/or a network entity, which may be examples of the corresponding devices described herein. Broadly, method 300 illustrates a non-limiting example method supporting power optimization by reducing PHR reporting with CGs when dynamic uplink grants are configured.

At 305, a UE may determine an average periodicity of dynamic grants received within a sliding window. For example, the UE may monitor for the dynamic grants within the duration of a sliding window, with the duration of the sliding window corresponding to X. Based on the number of dynamic grants received within the sliding window (e.g., during X), the UE may calculate, identify, or otherwise determine the periodicity for the dynamic grants received withing the sliding window, with the average periodicity corresponding to Y. The UE may use machine learning, artificial learning, or other learning models to identify or otherwise determine the average periodicity for the dynamic grants received during the sliding window. The duration of the sliding window (e.g., X) may be (pre)configured by the network and/or autonomously identified or determined by the UE.

At 310, the UE may identify or otherwise determine that a PHR trigger has occurred. Generally, the PHR trigger may correspond to a time, state, or event that would otherwise result in the UE performing a PHR reporting transmission to the network using CG resources to provide its PHR information. Examples of PHR triggers may include, but are not limited to, expiration of a PHR expiry timer and/or a threshold change in the downlink pathloss.

However and instead of automatically transmitting the PHR to the network using the CG resources, at 315 the UE may identify or otherwise determine whether it has uplink data to send (e.g., consider the buffer status of uplink buffer(s) of the UE). If the uplink buffer of the UE stores data, at 320 the UE may transmit or otherwise provide the PHR to the network using the CG resources identified in CG allocation(s).

If the uplink buffer of the UE is empty (e.g., does not store data), at 325 the UE may wait for a dynamic grant for Y milliseconds. That is, the UE may delay transmission of the PHR (e.g., the PHR triggered by the PHR trigger) for Y milliseconds that is based on the average periodicity of the dynamic grants received within the sliding window. This may be based on an expectation of receiving at least one dynamic grant within Y milliseconds based on the Y determined at 305 (e.g., based on receiving at least one dynamic grant every Y milliseconds within the most recent X ms, symbols, slots, sub-frames, and the like).

At 330, the UE may identify or otherwise determine whether at least one dynamic grant was received within the Y milliseconds. If at least one dynamic grant was received during the Y ms, at 335 the UE may transmit or otherwise provide a PHR to the network using the uplink resources identified in the dynamic grant. That is, the UE may use dynamic resources to transmit the PHR to the network rather than using CG resources to transmit the PHR (thus triggering potential empty TB(s) to be transmitted using the CS-RNTI grant).

If no dynamic grants are received during the Y ms, at 340 the UE may transmit or otherwise provide the PHR to the network using the CG resources identified or otherwise configured in the CG allocations. As discussed above, a maximum delay for PHR reporting may be adopted to ensure synchronization between the UE and network regarding UE transmit power.

Thus, the UE may provide the PHR to the network in response to the PHR trigger with a small delay corresponding to Y milliseconds. As one non-limiting example where the PHR periodicity is 100 ms, the CS-RNTI grant is for 20 slots (e.g., 10 ms with 30 KHz SCS), and a duration of the sliding window being 100 ms (e.g., X=100 ms), if the grant periodicity is 10 ms (e.g., Y=10 ms) then the improvements is skipping one CS-RNTI grant and sending the PHR within 10 ms. In an example where the grant periodicity is 20 ms (e.g., Y=20 ms), then the improvement is skipping two CS-RNTI grants and sending the PHR within 20 ms. In an example where the grant periodicity is 50 ms (e.g., Y=50 ms), then the improvement is skipping five CS-RNTI grants and sending the PHR within 50 ms. Finally, in an example where the grant periodicity is 100 ms (e.g., Y=100 ms), then the improvement is skipping ten CS-RNTI grants and sending the PHR within 100 ms. Further improvements relate to triggering PHR reporting using the CS-RNTI grants, even when there is no data stored in the uplink buffer of the UE.

Figure 4:
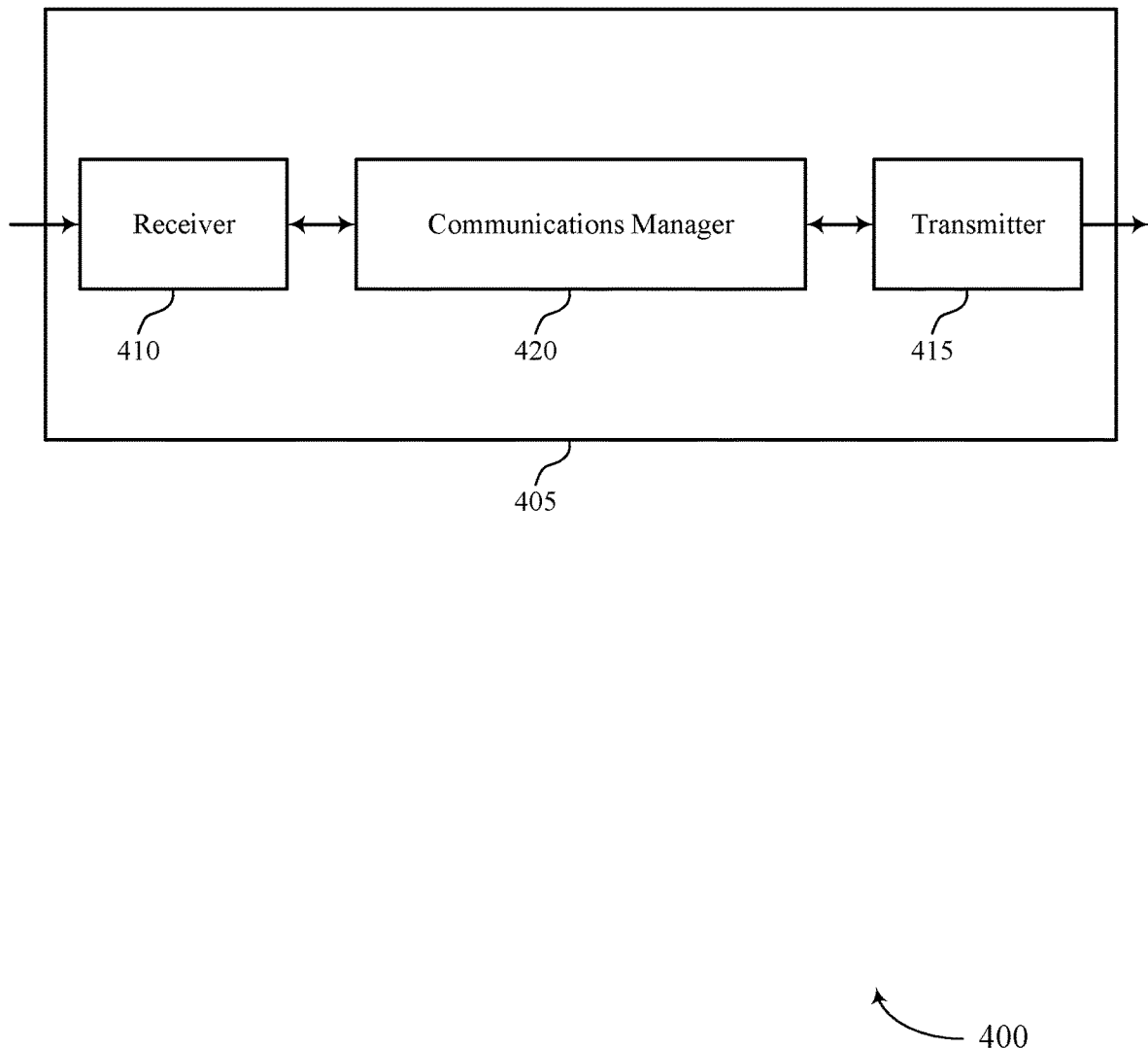
FIGS. 4 and 5 illustrate block diagrams of devices that support reduced power headroom reporting with CGs in accordance with one or more aspects of the present disclosure.

FIG. 4 illustrates a block diagram 400 of a device 405 that supports reduced power headroom reporting with CGs in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to reduced power headroom reporting with CGs). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to reduced power headroom reporting with CGs). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of reduced power headroom reporting with CGs as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication at a UE in accordance with examples as disclosed herein. For example, the communications manager 420 may be configured as or otherwise support a means for monitoring for dynamic grants to obtain an average periodicity of dynamic grants received within a sliding window. The communications manager 420 may be configured as or otherwise support a means for transmitting, based on detecting a PHR trigger, one or more PHRs identifying power headroom information based on the average periodicity of dynamic grants received within the sliding window and the PHR trigger.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for power optimizations for PHR reporting when CG and dynamic grants are configured for a UE.

Figure 5:
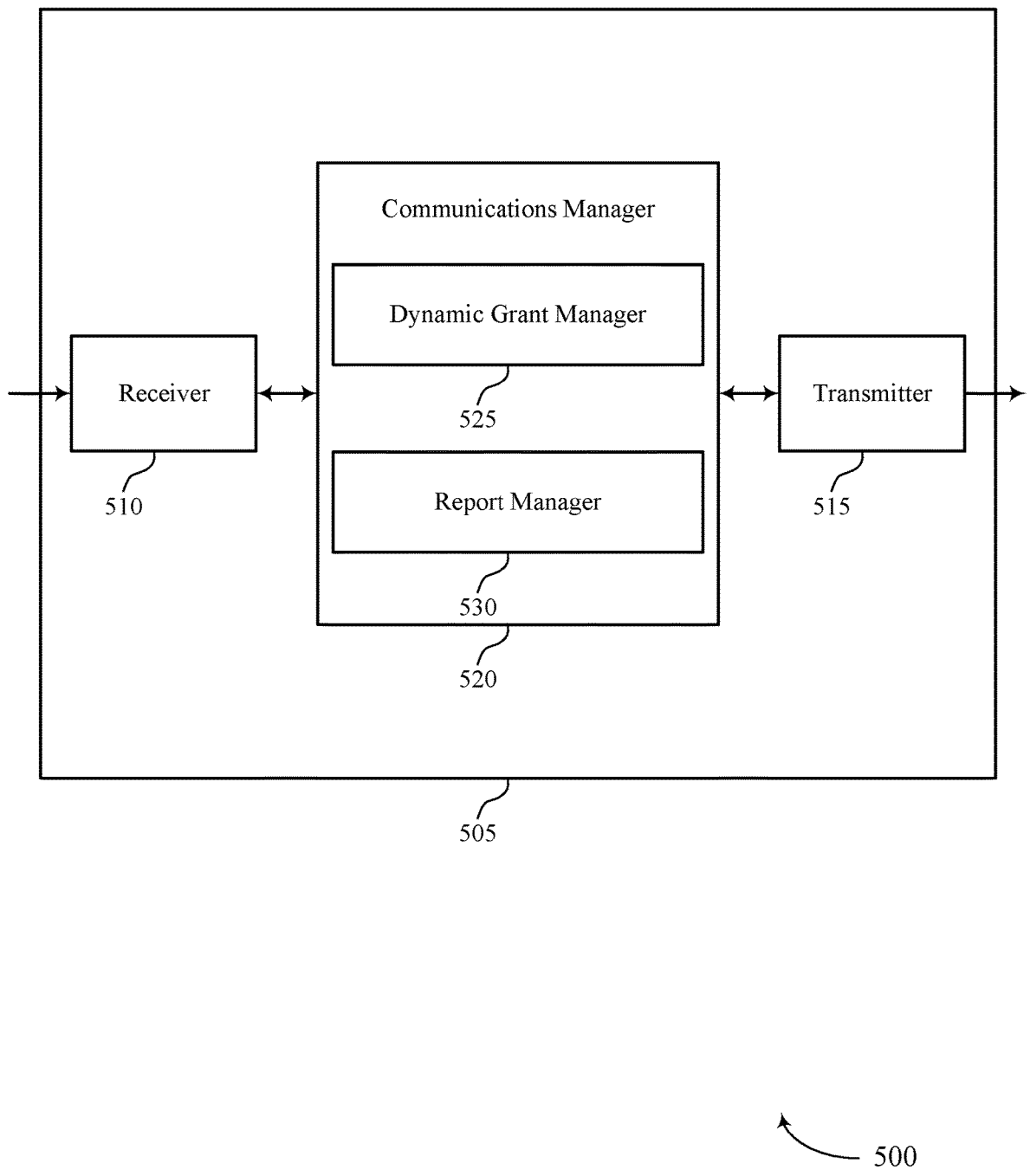

FIG. 5 illustrates a block diagram 500 of a device 505 that supports reduced power headroom reporting with CGs in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to reduced power headroom reporting with CGs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to reduced power headroom reporting with CGs). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of reduced power headroom reporting with CGs as described herein. For example, the communications manager 520 may include a dynamic grant manager 525 a report manager 530, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. The dynamic grant manager 525 may be configured as or otherwise support a means for monitoring for dynamic grants to obtain an average periodicity of dynamic grants received within a sliding window. The report manager 530 may be configured as or otherwise support a means for transmitting, based on detecting a PHR trigger, one or more PHRs identifying power headroom information based on the average periodicity of dynamic grants received within the sliding window and the PHR trigger.

Figure 6:
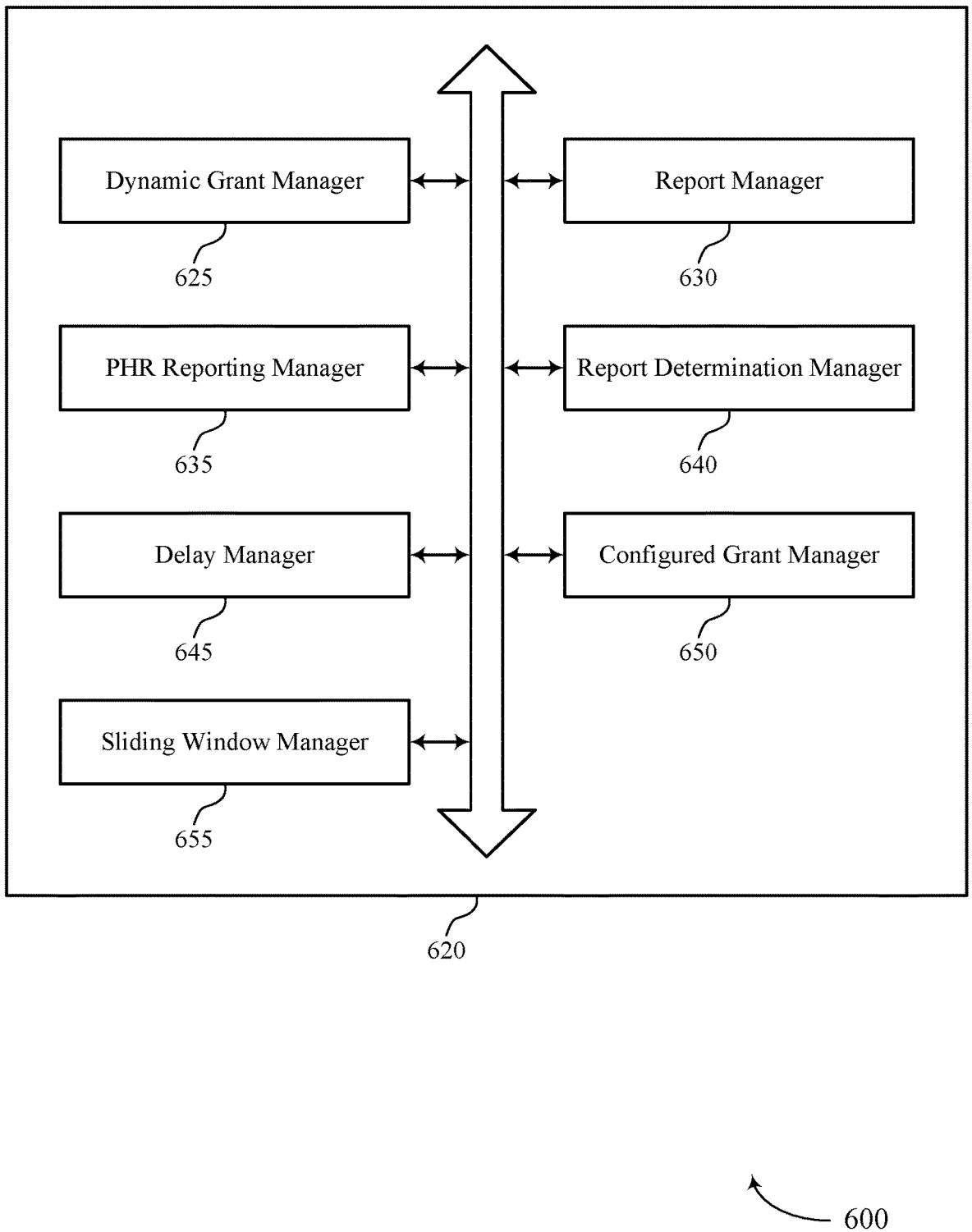
FIG. 6 illustrates a block diagram of a communications manager that supports reduced power headroom reporting with CGs in accordance with one or more aspects of the present disclosure.

FIG. 6 illustrates a block diagram 600 of a communications manager 620 that supports reduced power headroom reporting with CGs in accordance with one or more aspects of the present disclosure. The communications manager 620 may be an example of aspects of a communications manager 420, a communications manager 520, or both, as described herein. The communications manager 620, or various components thereof, may be an example of means for performing various aspects of reduced power headroom reporting with CGs as described herein. For example, the communications manager 620 may include a dynamic grant manager 625, a report manager 630, an PHR reporting manager 635, a report determination manager 640, a delay manager 645, a configured grant manager 650, a sliding window manager 655, or any combination thereof. Each of these components may communicate, directly or indirectly, with one another (e.g., via one or more buses).

The communications manager 620 may support wireless communication at a UE in accordance with examples as disclosed herein. The dynamic grant manager 625 may be configured as or otherwise support a means for monitoring for dynamic grants to obtain an average periodicity of dynamic grants received within a sliding window. The report manager 630 may be configured as or otherwise support a means for transmitting, based on detecting a PHR trigger, one or more PHRs identifying power headroom information based on the average periodicity of dynamic grants received within the sliding window and the PHR trigger.

In some examples, to support transmitting the one or more PHRs, the PHR reporting manager 635 may be configured as or otherwise support a means for delaying transmission of at least one of the one or more PHRs using configured grant resources based on the average periodicity of dynamic grants received within the sliding window.

In some examples, the report determination manager 640 may be configured as or otherwise support a means for detecting the power headroom trigger based on an uplink buffer status of the UE, expiration of a power headroom expiry timer, a threshold change in a downlink pathloss, or a combination thereof.

In some examples, the report determination manager 640 may be configured as or otherwise support a means for transmitting at least one of the one or more PHRs using at least a portion of configured grant resources based at least on part on an uplink buffer of the UE storing data.

In some examples, the report determination manager 640 may be configured as or otherwise support a means for receiving at least one dynamic grant during the sliding window, the at least one dynamic grant identifying uplink resources allocated to the UE. In some examples, the report determination manager 640 may be configured as or otherwise support a means for transmitting at least one PHR of the one or more PHRs using at least a portion of the uplink resources based at least on part on an uplink buffer of the UE being empty and receiving the at least one dynamic grant.

In some examples, the report determination manager 640 may be configured as or otherwise support a means for determining that a dynamic grant is not received during the sliding window. In some examples, the report determination manager 640 may be configured as or otherwise support a means for transmitting at least one PHR of the one or more PHRs using at least a portion of configured grant resources based at least on part on an uplink buffer of the UE being empty and the dynamic grant not being received during the sliding window.

In some examples, the delay manager 645 may be configured as or otherwise support a means for identifying a maximum PHR delay based on a duration of the sliding window, where at least one PHR is transmitted within the maximum PHR delay.

In some examples, the dynamic grant manager 625 may be configured as or otherwise support a means for applying a machine learning model to determine the average periodicity of dynamic grants received within the sliding window.

In some examples, the configured grant manager 650 may be configured as or otherwise support a means for receiving one or more radio resource control signals identifying one or more configured grant allocations, where a periodicity for transmitting the one or more PHRs is based on at least one of the one or more configured grant allocations.

In some examples, the sliding window manager 655 may be configured as or otherwise support a means for maintaining a running average of the average number of dynamic grants received during each instance of a duration of the sliding window across for a set of multiple instances.

Figure 7:
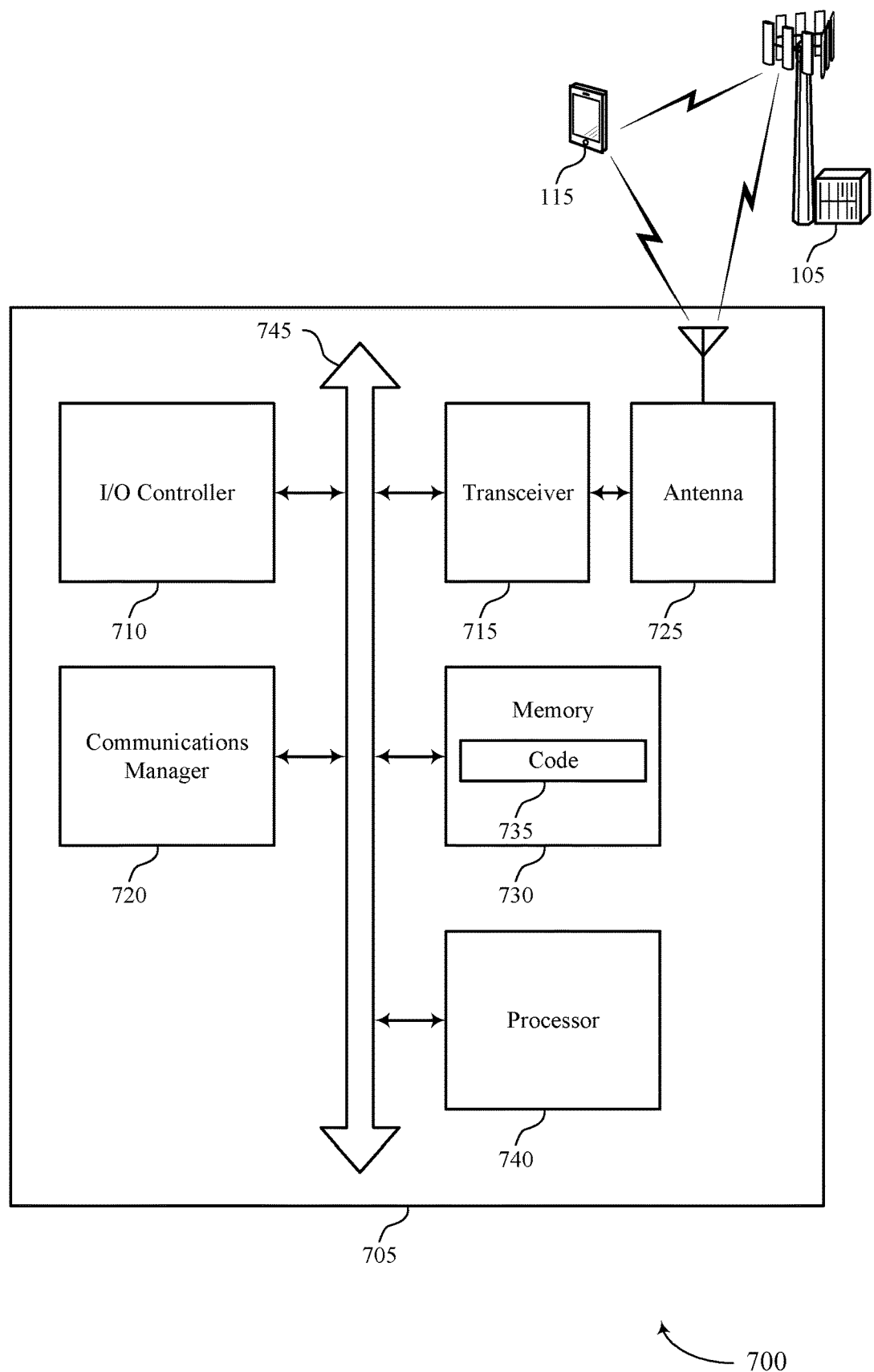
FIG. 7 illustrates a diagram of a system including a device that supports reduced power headroom reporting with CGs in accordance with one or more aspects of the present disclosure.

FIG. 7 illustrates a diagram of a system 700 including a device 705 that supports reduced power headroom reporting with CGs in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting reduced power headroom reporting with CGs). For example, the device 705 or a component of the device 705 may include a processor 740 and memory 730 coupled with or to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for monitoring for dynamic grants to obtain an average periodicity of dynamic grants received within a sliding window. The communications manager 720 may be configured as or otherwise support a means for transmitting, based on detecting a PHR trigger, one or more PHRs identifying power headroom information based on the average periodicity of dynamic grants received within the sliding window and the PHR trigger.

By including or configuring the communications manager 720 in accordance with examples as described herein, the device 705 may support techniques for power optimizations for PHR reporting when CG and dynamic grants are configured for a UE.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of reduced power headroom reporting with CGs as described herein, or the processor 740 and the memory 730 may be otherwise configured to perform or support such operations.

Figure 8:
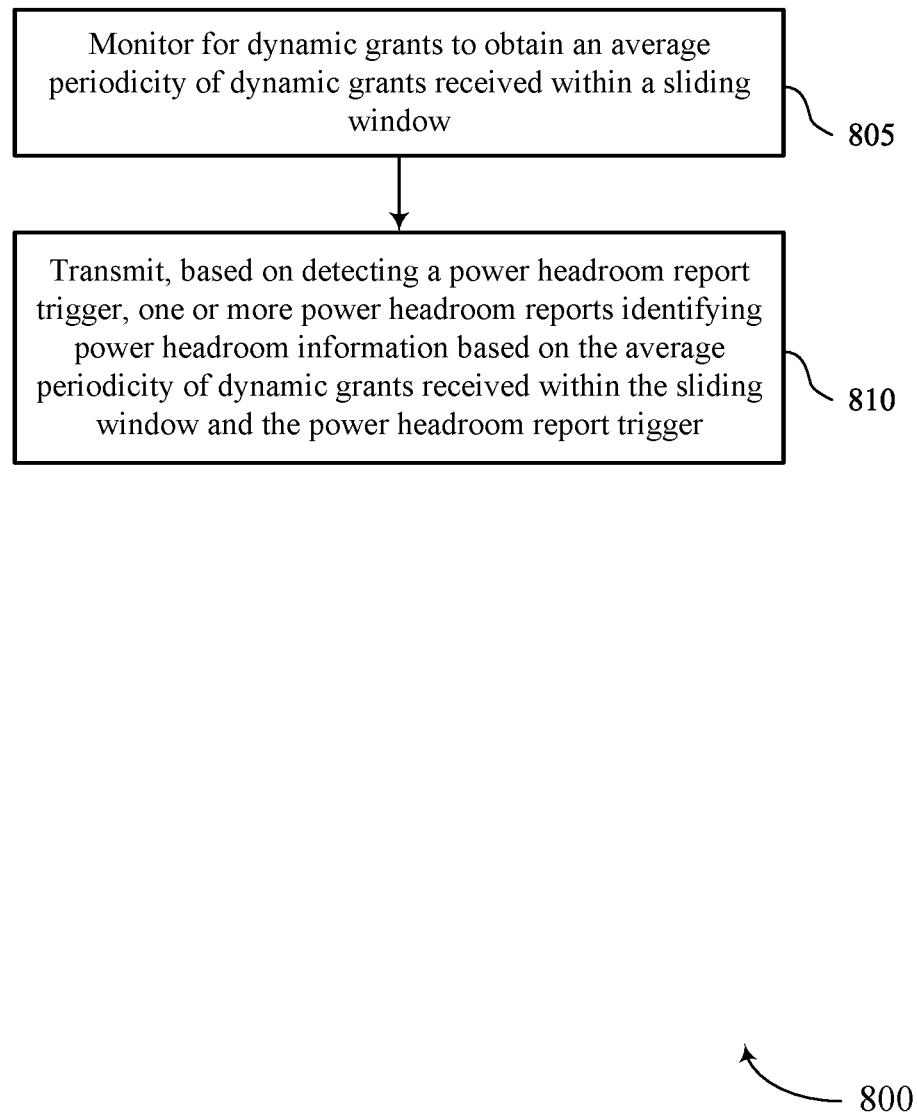
FIGS. 8 through 10 illustrate flowcharts showing methods that support reduced power headroom reporting with CGs in accordance with one or more aspects of the present disclosure.

FIG. 8 illustrates a flowchart showing a method 800 that supports reduced power headroom reporting with CGs in accordance with one or more aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 805, the method may include monitoring for dynamic grants to obtain an average periodicity of dynamic grants received within a sliding window. The operations of 805 may be performed in accordance with examples as disclosed herein. In some examples, aspects of the operations of 805 may be performed by a dynamic grant manager 625 as described with reference to FIG. 6.

At 810, the method may include transmitting, based on detecting a PHR trigger, one or more PHRs identifying power headroom information based on the average periodicity of dynamic grants received within the sliding window and the PHR trigger. The operations of 810 may be performed in accordance with examples as disclosed herein. In some examples, aspects of the operations of 810 may be performed by a report manager 630 as described with reference to FIG. 6.

Figure 9:
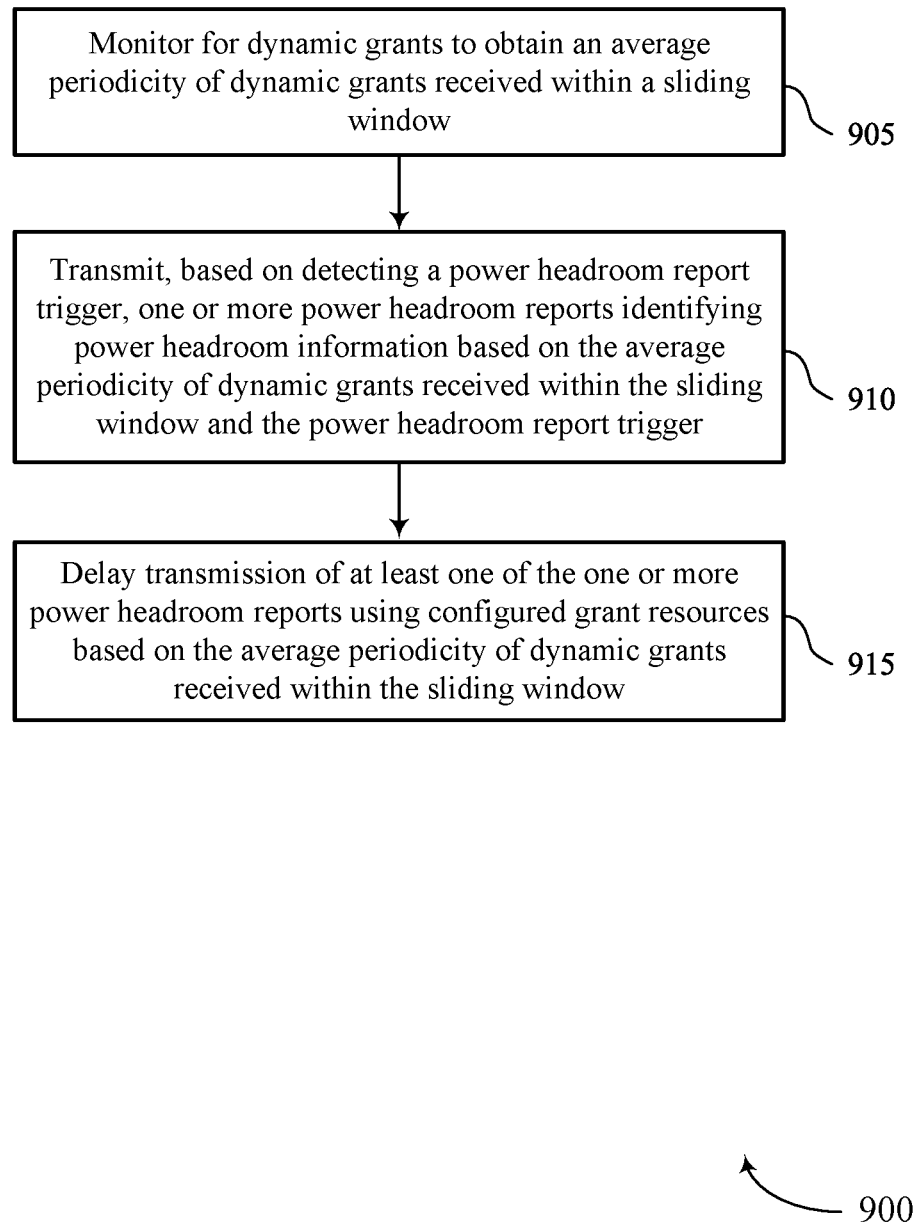

FIG. 9 illustrates a flowchart showing a method 900 that supports reduced power headroom reporting with CGs in accordance with one or more aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 905, the method may include monitoring for dynamic grants to obtain an average periodicity of dynamic grants received within a sliding window. The operations of 905 may be performed in accordance with examples as disclosed herein. In some examples, aspects of the operations of 905 may be performed by a dynamic grant manager 625 as described with reference to FIG. 6.

At 910, the method may include transmitting, based on detecting a PHR trigger, one or more PHRs identifying power headroom information based on the average periodicity of dynamic grants received within the sliding window and the PHR trigger. The operations of 910 may be performed in accordance with examples as disclosed herein. In some examples, aspects of the operations of 910 may be performed by a report manager 630 as described with reference to FIG. 6.

At 915, the method may include delaying transmission of at least one of the one or more PHRs using configured grant resources based on the average periodicity of dynamic grants received within the sliding window. The operations of 915 may be performed in accordance with examples as disclosed herein. In some examples, aspects of the operations of 915 may be performed by an PHR reporting manager 635 as described with reference to FIG. 6.

Figure 10:
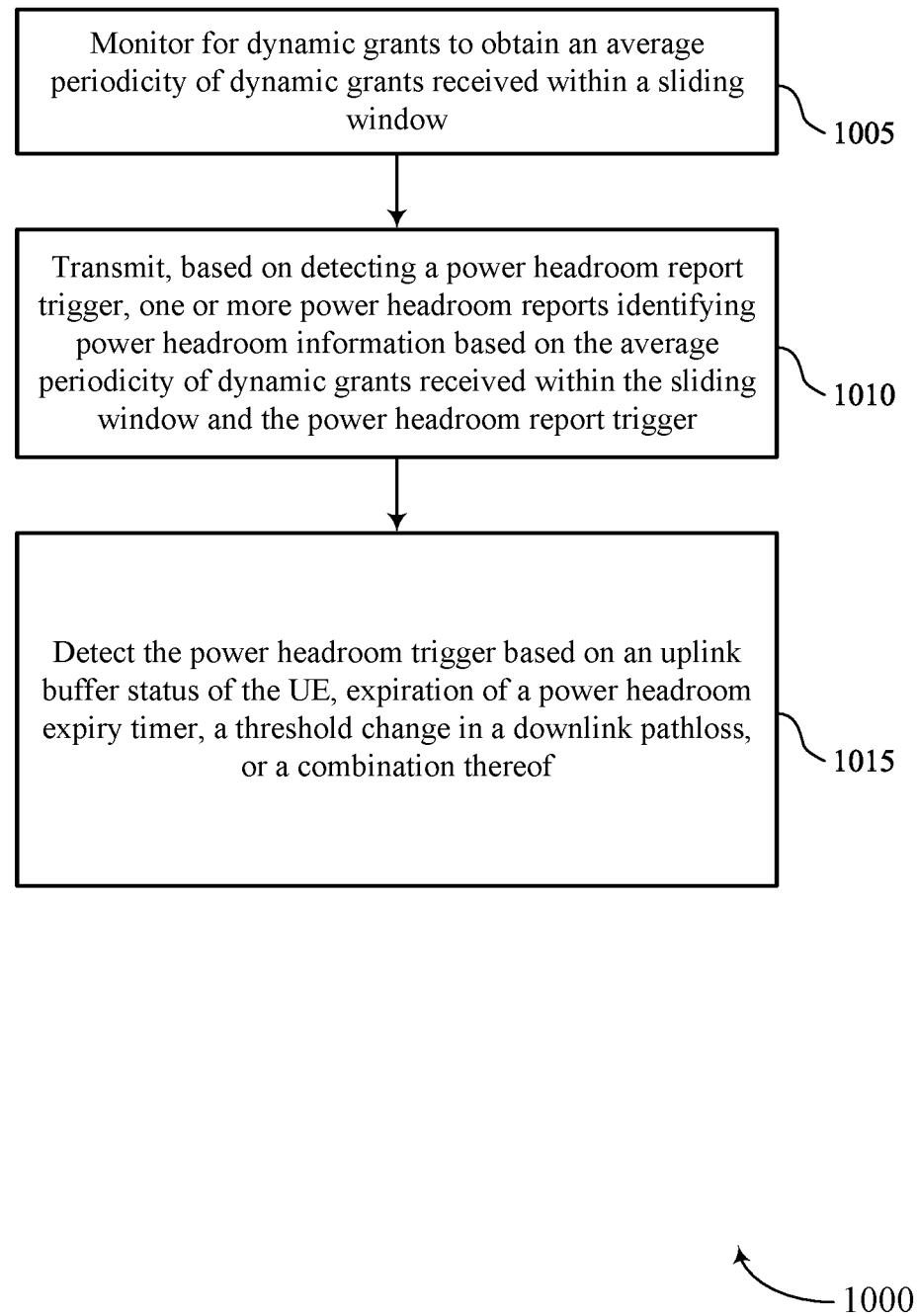

FIG. 10 illustrates a flowchart showing a method 1000 that supports reduced power headroom reporting with CGs in accordance with one or more aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1005, the method may include monitoring for dynamic grants to obtain an average periodicity of dynamic grants received within a sliding window. The operations of 1005 may be performed in accordance with examples as disclosed herein. In some examples, aspects of the operations of 1005 may be performed by a dynamic grant manager 625 as described with reference to FIG. 6.

At 1010, the method may include transmitting, based on detecting a PHR trigger, one or more PHRs identifying power headroom information based on the average periodicity of dynamic grants received within the sliding window and the PHR trigger. The operations of 1010 may be performed in accordance with examples as disclosed herein. In some examples, aspects of the operations of 1010 may be performed by a report manager 630 as described with reference to FIG. 6.

At 1015, the method may include detecting the power headroom trigger based on an uplink buffer status of the UE, expiration of a power headroom expiry timer, a threshold change in a downlink pathloss, or a combination thereof. The operations of 1015 may be performed in accordance with examples as disclosed herein. In some examples, aspects of the operations of 1015 may be performed by a report determination manager 640 as described with reference to FIG. 6.

The following provides an overview of aspects of the present disclosure:

Aspect 1: A method for wireless communication at a UE, comprising: monitoring for dynamic grants to obtain an average periodicity of dynamic grants received within a sliding window; and transmitting, based at least in part on detecting a PHR trigger, one or more PHRs identifying power headroom information based at least in part on the average periodicity of dynamic grants received within the sliding window and the PHR trigger.

Aspect 2: The method of aspect 1, wherein transmitting the one or more PHRs comprises: delaying transmission of at least one of the one or more PHRs using CG resources based at least in part on the average periodicity of dynamic grants received within the sliding window.

Aspect 3: The method of any of aspects 1 through 2, further comprising: detecting the power headroom trigger based at least in part on an uplink buffer status of the UE, expiration of a power headroom expiry timer, a threshold change in a downlink pathloss, or a combination thereof.

Aspect 4: The method of aspect 3, further comprising: transmitting at least one of the one or more PHRs using at least a portion of CG resources based at least on part on an uplink buffer of the UE storing data.

Aspect 5: The method of any of aspects 3 through 4, further comprising: receiving at least one dynamic grant during the sliding window, the at least one dynamic grant identifying uplink resources allocated to the UE; and transmitting at least one PHR of the one or more PHRs using at least a portion of the uplink resources based at least on part on an uplink buffer of the UE being empty and receiving the at least one dynamic grant.

Aspect 6: The method of any of aspects 3 through 5, further comprising: determining that a dynamic grant is not received during the sliding window; and transmitting at least one PHR of the one or more PHRs using at least a portion of CG resources based at least on part on an uplink buffer of the UE being empty and the dynamic grant not being received during the sliding window.

Aspect 7: The method of any of aspects 1 through 6, further comprising: identifying a maximum PHR delay based at least in part on a duration of the sliding window, wherein at least one PHR is transmitted within the maximum PHR delay.

Aspect 8: The method of any of aspects 1 through 7, further comprising: applying a machine learning model to determine the average periodicity of dynamic grants received within the sliding window.

Aspect 9: The method of any of aspects 1 through 8, further comprising: receiving one or more RRC signals identifying one or more CG allocations, wherein a periodicity for transmitting the one or more PHRs is based on at least one of the one or more CG allocations.

Aspect 10: The method of any of aspects 1 through 9, further comprising: maintaining a running average of the average periodicity of dynamic grants received during each instance of a duration of the sliding window across for a plurality of instances.

Aspect 11: An apparatus for wireless communication at a UE, comprising a processor; memory coupled with the processor; and instructions stored in the memory and executable by the processor to cause the apparatus to perform a method of any of aspects 1 through 10.

Aspect 12: An apparatus for wireless communication at a UE, comprising at least one means for performing a method of any of aspects 1 through 10.

Aspect 13: A non-transitory computer-readable medium storing code for wireless communication at a UE, the code comprising instructions executable by a processor to perform a method of any of aspects 1 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
    a processor;
    memory coupled with the processor; and
    instructions stored in the memory and executable by the processor to cause the apparatus to:
        monitor for dynamic grants to obtain an average periodicity of dynamic grants received within a sliding window; and
        transmit, based at least in part on detecting a power headroom report trigger, one or more power headroom reports identifying power headroom information based at least in part on the average periodicity of dynamic grants received within the sliding window and the power headroom report trigger.

2. The apparatus of claim 1, wherein the instructions to transmit the one or more power headroom reports are executable by the processor to cause the apparatus to:
    delay transmission of at least one of the one or more power headroom reports using configured grant resources based at least in part on the average periodicity of dynamic grants received within the sliding window.

3. The apparatus of claim 1, wherein the instructions are further executable by the processor to cause the apparatus to:
    detecting the power headroom trigger based at least in part on an uplink buffer status of the UE, expiration of a power headroom expiry timer, a threshold change in a downlink pathloss, or a combination thereof.

4. The apparatus of claim 3, wherein the instructions are further executable by the processor to cause the apparatus to:
    transmit at least one of the one or more power headroom reports using at least a portion of configured grant resources based at least on part on an uplink buffer of the UE storing data.

5. The apparatus of claim 3, wherein the instructions are further executable by the processor to cause the apparatus to:
    receive at least one dynamic grant during the sliding window, the at least one dynamic grant identifying uplink resources allocated to the UE; and
    transmit at least one power headroom report of the one or more power headroom reports using at least a portion of the uplink resources based at least on part on an uplink buffer of the UE being empty and receiving the at least one dynamic grant.

6. The apparatus of claim 3, wherein the instructions are further executable by the processor to cause the apparatus to:
determine that a dynamic grant is not received during the sliding window; and
transmit at least one power headroom report of the one or more power headroom reports using at least a portion of configured grant resources based at least on part on an uplink buffer of the UE being empty and the dynamic grant not being received during the sliding window.

7. The apparatus of claim 1, wherein the instructions are further executable by the processor to cause the apparatus to:
identify a maximum power headroom report delay based at least in part on a duration of the sliding window, wherein at least one power headroom report is transmitted within the maximum power headroom report delay.

8. The apparatus of claim 1, wherein the instructions are further executable by the processor to cause the apparatus to:
apply a machine learning model to determine the average periodicity of dynamic grants received within the sliding window.

9. The apparatus of claim 1, wherein the instructions are further executable by the processor to cause the apparatus to:
receive one or more radio resource control signals identifying one or more configured grant allocations, wherein a periodicity for transmitting the one or more power headroom reports is based on at least one of the one or more configured grant allocations.

10. The apparatus of claim 1, wherein the instructions are further executable by the processor to cause the apparatus to:
maintain a running average of the average periodicity of dynamic grants received during each instance of a duration of the sliding window across for a plurality of instances.

11. A method for wireless communication at a user equipment (UE), comprising:
monitoring for dynamic grants to obtain an average periodicity of dynamic grants received within a sliding window; and
transmitting, based at least in part on detecting a power headroom report trigger, one or more power headroom reports identifying power headroom information based at least in part on the average periodicity of dynamic grants received within the sliding window and the power headroom report trigger.

12. The method of claim 11, wherein transmitting the one or more power headroom reports comprises:
delaying transmission of at least one of the one or more power headroom reports using configured grant resources based at least in part on the average periodicity of dynamic grants received within the sliding window.

13. The method of claim 11, further comprising:
detecting the power headroom trigger based at least in part on an uplink buffer status of the UE, expiration of a power headroom expiry timer, a threshold change in a downlink pathloss, or a combination thereof.

14. The method of claim 13, further comprising:
transmitting at least one of the one or more power headroom reports using at least a portion of configured grant resources based at least on part on an uplink buffer of the UE storing data.

15. The method of claim 13, further comprising:
receiving at least one dynamic grant during the sliding window, the at least one dynamic grant identifying uplink resources allocated to the UE; and
transmitting at least one power headroom report of the one or more power headroom reports using at least a portion of the uplink resources based at least on part on an uplink buffer of the UE being empty and receiving the at least one dynamic grant.

16. The method of claim 13, further comprising:
determining that a dynamic grant is not received during the sliding window; and
transmitting at least one power headroom report of the one or more power headroom reports using at least a portion of configured grant resources based at least on part on an uplink buffer of the UE being empty and the dynamic grant not being received during the sliding window.

17. The method of claim 11, further comprising:
identifying a maximum power headroom report delay based at least in part on a duration of the sliding window, wherein at least one power headroom report is transmitted within the maximum power headroom report delay.

18. The method of claim 11, further comprising:
applying a machine learning model to determine the average periodicity of dynamic grants received within the sliding window.

19. The method of claim 11, further comprising:
receiving one or more radio resource control signals identifying one or more configured grant allocations, wherein a periodicity for transmitting the one or more power headroom reports is based on at least one of the one or more configured grant allocations.

20. The method of claim 11, further comprising:
maintaining a running average of the average periodicity of dynamic grants received during each instance of a duration of the sliding window across for a plurality of instances.

21. An apparatus for wireless communication at a user equipment (UE), comprising:
means for monitoring for dynamic grants to obtain an average periodicity of dynamic grants received within a sliding window; and
means for transmitting, based at least in part on detecting a power headroom report trigger, one or more power headroom reports identifying power headroom information based at least in part on the average periodicity of dynamic grants received within the sliding window and the power headroom report trigger.

22. The apparatus of claim 21, wherein the means for transmitting the one or more power headroom reports comprise:
means for delaying transmission of at least one of the one or more power headroom reports using configured grant resources based at least in part on the average periodicity of dynamic grants received within the sliding window.

23. The apparatus of claim 21, further comprising:
means for detecting the power headroom trigger based at least in part on an uplink buffer status of the UE, expiration of a power headroom expiry timer, a threshold change in a downlink pathloss, or a combination thereof.

24. The apparatus of claim 23, further comprising:
means for transmitting at least one of the one or more power headroom reports using at least a portion of configured grant resources based at least on part on an uplink buffer of the UE storing data.

25. The apparatus of claim 23, further comprising:

means for receiving at least one dynamic grant during the sliding window, the at least one dynamic grant identifying uplink resources allocated to the UE; and means for transmitting at least one power headroom report of the one or more power headroom reports using at least a portion of the uplink resources based at least on part on an uplink buffer of the UE being empty and receiving the at least one dynamic grant.

26. The apparatus of claim 23, further comprising:

means for determining that a dynamic grant is not received during the sliding window; and means for transmitting at least one power headroom report of the one or more power headroom reports using at least a portion of configured grant resources based at least on part on an uplink buffer of the UE being empty and the dynamic grant not being received during the sliding window.

27. The apparatus of claim 21, further comprising:

means for identifying a maximum power headroom report delay based at least in part on a duration of the sliding window, wherein at least one power headroom report is transmitted within the maximum power headroom report delay.

28. The apparatus of claim 21, further comprising:

means for applying a machine learning model to determine the average periodicity of dynamic grants received within the sliding window.

29. The apparatus of claim 21, further comprising:

means for receiving one or more radio resource control signals identifying one or more configured grant allocations, wherein a periodicity for transmitting the one or more power headroom reports is based on at least one of the one or more configured grant allocations.

30. A non-transitory computer-readable medium storing code for wireless communication at a user equipment (UE), the code comprising instructions executable by a processor to:

monitor for dynamic grants to obtain an average periodicity of dynamic grants received within a sliding window; and transmit, based at least in part on detecting a power headroom report trigger, one or more power headroom reports identifying power headroom information based at least in part on the average periodicity of dynamic grants received within the sliding window and the power headroom report trigger.

* * * * *